US009092481B2

(12) United States Patent
Digana

(10) Patent No.: US 9,092,481 B2
(45) Date of Patent: Jul. 28, 2015

(54) METHOD AND SYSTEM FOR PROCESSING GRAPH QUERIES

(71) Applicant: SOFTWARE AG, Darmstadt (DE)

(72) Inventor: Tibor Digana, Zilina (SK)

(73) Assignee: SOFTWARE AG, Darmstadt (DE)

( * ) Notice: Subject to any disclaimer, the term of this patent is extended or adjusted under 35 U.S.C. 154(b) by 166 days.

(21) Appl. No.: 13/764,846

(22) Filed: Feb. 12, 2013

(65) Prior Publication Data

US 2014/0136520 A1    May 15, 2014

(30) Foreign Application Priority Data

Nov. 12, 2012  (EP) .................................. 12192187

(51) Int. Cl.
*G06F 7/00* (2006.01)
*G06F 17/30* (2006.01)
(52) U.S. Cl.
CPC .... *G06F 17/30424* (2013.01); *G06F 17/30958* (2013.01)
(58) Field of Classification Search
CPC .......... G06F 17/3053; G06F 17/30477; G06F 17/30554; G06F 17/30424; G06F 17/30864
USPC ........................................................ 707/722
See application file for complete search history.

(56) References Cited

U.S. PATENT DOCUMENTS

| 5,761,077 | A | 6/1998 | Shackleford | |
|---|---|---|---|---|
| 6,611,842 | B1 * | 8/2003 | Brown ................................. | 1/1 |
| 6,625,595 | B1 * | 9/2003 | Anderson et al. ..................... | 1/1 |
| 6,636,853 | B1 * | 10/2003 | Stephens, Jr. ........................ | 1/1 |
| 6,941,236 | B2 | 9/2005 | Huelsbergen et al. | |
| 7,177,798 | B2 | 2/2007 | Hsu et al. | |
| 7,702,620 | B2 | 4/2010 | He et al. | |
| 7,797,344 | B2 * | 9/2010 | Kaul et al. .................... | 707/791 |
| 7,933,915 | B2 * | 4/2011 | Singh et al. ................... | 707/760 |
| 8,073,869 | B2 * | 12/2011 | Li et al. ......................... | 707/780 |
| 8,095,515 | B2 * | 1/2012 | Sereni et al. ................... | 707/688 |
| 8,095,560 | B2 | 1/2012 | Alnahlawi | |
| 8,131,718 | B2 * | 3/2012 | Tran ............................. | 707/732 |
| 8,244,662 | B2 * | 8/2012 | Coury et al. ................... | 706/46 |

(Continued)

OTHER PUBLICATIONS

Mohamed Saber et al., "An Efficient Filtering Technique for Super-Graph Query Processing," Digital Information Management (ICDIM), 2010 Fifth International Conference ON, IEEE, Piscataway, NJ, Jul. 5, 2010, pp. 174-181.

(Continued)

*Primary Examiner* — Robert Beausoliel, Jr.
*Assistant Examiner* — Nicholas Allen
(74) *Attorney, Agent, or Firm* — Nixon & Vanderhye PC

(57) ABSTRACT

In certain example embodiments, a graph query retrieves data items from a data source by indicating a source node, a target node, and a plurality of edges between the source and target nodes. Each edge includes one or more relation conditions. Each relation condition defines a mapping between items of one of the source item types and items of one of the target item types. The edges are selected and traversed from the source node to the target node in accordance with the relation condition(s), producing an intermediate set of result items including items of the data source that belong to the at least one target item type and fulfill the corresponding relation condition(s). Items from the intermediate set of result items that do not fulfill the corresponding relation condition(s) are deleted as further traversals are made. The intermediate set ultimately is returned as the graph query result.

19 Claims, 9 Drawing Sheets

(56) References Cited

U.S. PATENT DOCUMENTS

Figure 1:
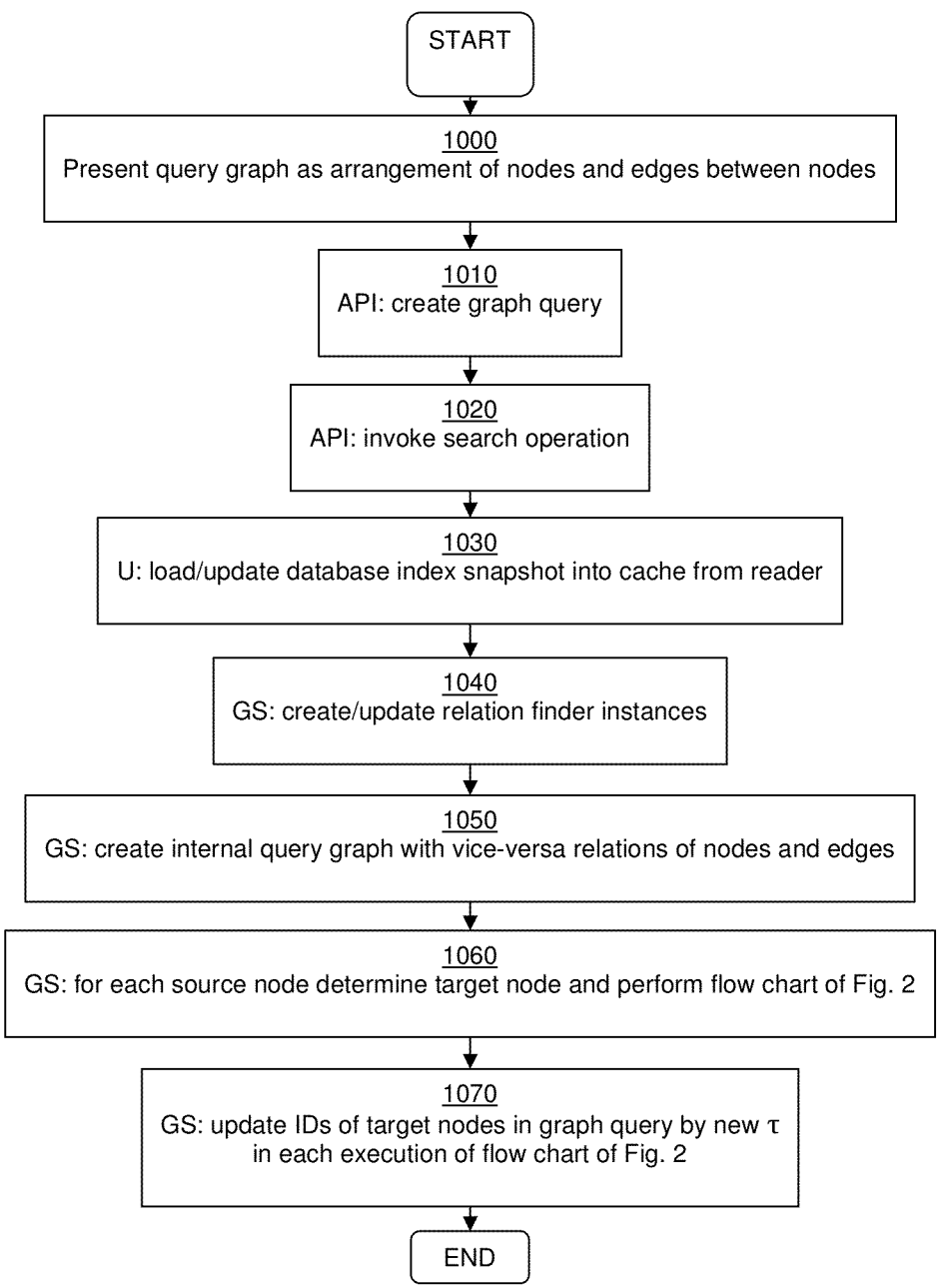

| | | | |
|---|---|---|---|
| 8,290,975 B2* | 10/2012 | Gao et al. | 707/767 |
| 8,316,060 B1* | 11/2012 | Snyder et al. | 707/797 |
| 8,326,847 B2* | 12/2012 | Balmin et al. | 707/754 |
| 2002/0152224 A1* | 10/2002 | Roth et al. | 707/104.1 |
| 2007/0274519 A1* | 11/2007 | Cohen et al. | 380/201 |
| 2008/0189240 A1* | 8/2008 | Mullins et al. | 707/2 |
| 2009/0240682 A1* | 9/2009 | Balmin et al. | 707/5 |
| 2010/0211924 A1* | 8/2010 | Begel et al. | 717/101 |
| 2011/0173189 A1* | 7/2011 | Singh et al. | 707/722 |
| 2011/0238607 A1* | 9/2011 | Coury et al. | 706/46 |
| 2011/0246473 A1* | 10/2011 | Stec | 707/741 |
| 2011/0249002 A1 | 10/2011 | Duplessis et al. | |
| 2011/0313984 A1 | 12/2011 | Zhou et al. | |
| 2012/0095998 A1* | 4/2012 | Sheehan et al. | 707/728 |
| 2012/0096002 A1* | 4/2012 | Sheehan et al. | 707/737 |
| 2012/0096043 A1* | 4/2012 | Stevens, Jr. | 707/798 |
| 2012/0215791 A1* | 8/2012 | Malik et al. | 707/749 |
| 2012/0265773 A1* | 10/2012 | Mcglashan et al. | 707/754 |
| 2012/0266146 A1* | 10/2012 | Chamieh et al. | 717/139 |
| 2012/0271831 A1* | 10/2012 | Narayanan et al. | 707/741 |
| 2012/0271860 A1* | 10/2012 | Graham et al. | 707/798 |
| 2012/0317121 A1* | 12/2012 | Fuchs et al. | 707/749 |
| 2012/0317142 A1* | 12/2012 | Broecheler et al. | 707/770 |
| 2012/0317149 A1* | 12/2012 | Jagota et al. | 707/798 |
| 2012/0323932 A1* | 12/2012 | Xin et al. | 707/749 |
| 2012/0330945 A1* | 12/2012 | Lunt et al. | 707/727 |
| 2013/0036120 A1* | 2/2013 | Pitman et al. | 707/737 |
| 2014/0136520 A1* | 5/2014 | Digana | 707/722 |

OTHER PUBLICATIONS

Matthias Brocheler et al., "A Budget-Based Algorithm for Efficient Subgraph Matching on Huge Networks," Data Engineering Workshops (ICDEW), 2011 IEEE 27$^{th}$ International Conference on, Apr. 11, 2011, pp. 94-99.

James Cheng et al., "Fast Graph Query Processing with a Low-Cost Index," The VLDB Journal—The International Journal on Very Large Data Bases, Springer, vol. 20, No. 4, Dec. 16, 2010, pp. 521-539.

[Online], Wikipedia Search—Bidirectional Search, http://en.wikipedia.org/wiki/Bidirectional_search, printed Feb. 11, 2013, 3 pages.

[Online], Wikipedia Search—Graph database, http://en.wikipedia.org/wiki/Graph_databases#Distributed_Graph_Processing_.28mostly_in-memory-only.29, printed Feb. 11, 2013, 5 pages.

[Online], Wikipedia Search—A* search algorithm—http://en.wikipedia.org/wiki/A*_search_algorithm, printed Feb. 11, 2013, 8 pages.

[Online], Wikipedia Search—List of algorithms—http://en.wikipedia.org/wiki/List_of_algorithms#Graph_algorithms, printed on Feb. 11, 2013, 29 pages.

[Online], Wikipedia Search—Boruvka's algorithm—http://en.wikipedia.org/wiki/Bor%C5%AFvka%27s_algorithm, printed on Feb. 11, 2013, 3 pages.

Auer et al., "A Case Study of Revisiting Best-First vs Depth-First Search", [Online], http://www.frontiersinai.com/ecai/ecai2004/ecai04/pdf/p0141.pdf, printed on Feb. 11, 2013, 5 pages.

* cited by examiner

Fig. 10

| | |
|---|---|
| 1 | $\tau \leftarrow \emptyset$ |
| 2 | foreach $it_T \in IT_T$ do |
| 3 |     foreach $e \in \varepsilon \xleftarrow{order} \{edges \mid edges \ni R \ni it_T\}$ do |
| 4 |         if $e$ $1^{st}$ in ordered set $\varepsilon$ then |
| 5 |             /*only first iteration in this loop*/ |
| 6 |             foreach $r \in R_e$ do |
| 7 |                 $\Delta \leftarrow ff(r,s)$ |
| 8 |                 $\tau \leftarrow \tau \cup \Delta$ |
| 9 |             endforeach |
| 10 |             ⟨update statistics: population of ids in $\tau$ per $it_T$⟩ |
| 11 |         endif |
| 12 |     endforeach |
| 13 | endforeach |

Fig. 11

| | |
|---|---|
| 1 | foreach $id \in \tau_{it_T}$ do /* $\tau_{it_T}$ is logical set of ids with same item type $it_T$ */ |
| 2 |     foreach $e \in \varepsilon \xleftarrow{order} \{edges \mid edges \ni R \ni it_T\}$ do |
| 3 |         if $e$ not $1^{st}$ in ordered set $\varepsilon$ then |
| 4 |             /* condition: $R_e \neq \emptyset$ */ |
| 5 |             foreach $r \in R_e$ do |
| 6 |                 $\sigma \leftarrow bf(r, id)$ |
| 7 |                 If $\sigma \cap s \neq \emptyset$ then |
| 8 |                     goto *next_edge* |
| 9 |                 endif |
| 10 |             endforeach |
| 11 |             ⟨update statistics: decrease population in $\tau$ per $it_T$⟩ |
| 12 |             $\tau_{it_T} \leftarrow \tau_{it_T} \setminus \{id\}$ |
| 13 |             goto *next_id* |
| 14 |         endif |
| 15 | *next_edge*: |
| 16 |     endforeach |
| 17 | *next_id*: |
| 18 | endforeach |

# METHOD AND SYSTEM FOR PROCESSING GRAPH QUERIES

This application claims priority to EP 12 192 187.8 filed 12 Nov. 2012, the entire content of which is hereby incorporated by reference.

1. TECHNICAL FIELD

Certain example embodiments relate to a method and a system for processing graph queries.

2. BACKGROUND AND SUMMARY

Data-intensive computing systems are nowadays increasingly based on data that is structured as a graph, i.e. a collection of nodes and edges interconnecting the nodes. For example, graph databases exist in the prior art which use graph structures with nodes, edges and properties to represent and store data. In such graph data structures, the data is typically queried using query graphs. In other words, the user formulates a query in the form of a graph with at least two nodes, and the system then fills the formulated query graph with those data items in the database which fulfill the search conditions of the query graph (cf. e.g. http://en.wikipedia.org/wiki/Graph_databases).

To efficiently process graph queries, various approaches have been developed in the prior art (cf. e.g. http://en.wikipedia.org/wiki/Bidirectional_search). However, a common obstacle of the known approaches is that processing a graph query typically involves a high amount of redundant data, which consumes vast amounts of memory and thus leads to poor performance.

In relation to the general field of graph data processing, U.S. Pat. No. 7,702,620 relates to a system and method for ranked keyword search on graphs. The approach disclosed therein deals with a ranked keyword search on the top of a graph-structured database, and with fast searching the closest keywords across prepared/indexed graphs of words which is improved by prioritized words and blocks. However, the patent does not provide a general approach for efficiently processing graph queries.

Generally speaking, a graph query is a data structure that indicates at least a source node, a target node, and one or more edges there-between.

Each node and edge may comprise one or more relation conditions, which represent search conditions of the query graph. According to the approach predominantly followed in the prior art, such a graph query is processed as follows: For a given source node, the outgoing edge(s) is/are examined and the respective relation conditions are evaluated towards the connected target node(s), which results in an intermediate set of result items. This approach is repeated for each source node. When all source nodes have been processed, the respective intermediate result sets are intersected in order to retrieve the final result of the graph query. As the person skilled in the art will appreciate, this prior art approach, however, consumes vast amounts of memory due to the temporal storing of the intermediate result sets, which also has a negative effect on the efficiency of the graph query processing.

It is therefore the technical problem underlying certain example embodiments to provide an approach for processing a graph query which is more efficient and consumes less memory and computing resources, thereby at least partly overcoming the above explained disadvantages of the prior art.

This problem is according to one example aspect solved by a computer-implemented method for processing a graph query. The graph query serves for retrieving data items from a data source by indicating at least a source node representing one or more source item types, a target node representing one or more target item types, and a plurality of edges between the source node and the target node, wherein each edge comprises one or more relation conditions, wherein each relation condition defines a mapping between items of one of the source item types and items of one of the target item types. In the embodiment of claim 1, the the method comprises the following steps:

a. selecting a first edge of the plurality of edges;
b. traversing the selected first edge from the source node to the target node in accordance with the one or more relation conditions of the first edge to produce an intermediate set of result items, wherein the intermediate set of result items comprises the items of the data source which belong to the at least one target item type and which fulfill the corresponding one or more relation conditions;
c. selecting a further edge of the plurality of edges;
d. traversing the selected further edge from the target node to the source node in accordance with the one or more relation conditions of the selected further edge, and deleting items from the intermediate set of result items produced in step b. which do not fulfill the corresponding one or more relation conditions;
e. repeating steps c. and d. for each further edge of the plurality of edges; and
f. returning the intermediate set of result items as the result of the graph query.

Accordingly, the embodiment defines a particularly efficient way of processing a graph query in order to retrieve data items from a data source, wherein the graph query involves a plurality of edges. In this context, the term "data source" is understood as any type of source for data items, such as a database (e.g. relational database, object database, graph database), a cache, a file system, or even a software or hardware sensor or application producing data (e.g. streaming data). Contrary to the prior art approach explained further above, the method does not evaluate each edge in the direction from the source node to the target node and then intersects the intermediate result sets into a final result. Rather, certain example embodiments propose to evaluate only a first one of the plurality of edges in the direction from source to target node (also referred to as "forward filtering" hereinafter), which results in an intermediate set of result items. Then, the method evaluates each further edge of the plurality of edges in the inverse direction, i.e. from the target node towards the source node (also referred to as "backward filtering" hereinafter). During this process, each item in the intermediate set of result items (which was retrieved during the forward filtering) is checked whether it meets the relation conditions of the other edges and if not, the item is deleted from the intermediate result set. Accordingly, the certain example embodiments fundamentally deviate from the prior art approach in that only one single intermediate result set is generated during the forward filtering phase, which is then successively reduced (in that "false results" are deleted therefrom) during the backward filtering. Accordingly, the present inventive method requires far less memory and computing resources due to the decreased generation of intermediate results.

In one aspect of certain example embodiments, the selected first edge may comprise a plurality of relation conditions, and step b. above (i.e. the forward filtering) may comprise producing the intermediate set of result items as the union of the results of each relation condition. Accordingly, the method is able to efficiently process particularly complex graph queries in which the edges may have more than one relation conditions, i.e. search criterion, attached thereto. Preferably, the above steps c.-e. (i.e. the backward filtering) are performed iteratively for each item in the intermediate set of result items.

In another aspect of certain example embodiments, selecting a first edge of the plurality of edges in step a. may comprise selecting the edge which, when traversed in step b., is expected to result in a minimal intermediate set of result items. In other words, the edges are preferably ordered according to their expected impact on the size of the intermediate set of result items, and the forward filtering is applied to that edge which is expected to result in a minimal intermediate set of result items. This way, the memory consumption of certain example embodiments can be further minimized to a great extent. Preferably, the selected edge is the edge which is connected to the least amount of source items.

In more complex scenarios, the graph query may indicate a target node comprising a plurality of target item types, and the above-explained steps a. and b. may be performed iteratively for each of the plurality of target item types, so that the intermediate set of result items comprises the items of the data source which belong to any of the plurality of target item types. In this scenario, steps c.-e. are preferably performed iteratively for each of the plurality of target item types.

In a preferred implementation of the inventive graph query processing method, the intermediate set of result items stores IDs representing the respective items in the data source. In other words, instead of directly storing the respective data items that in the intermediate set of result items (which may consume more or less memory depending on their structure), only IDs, i.e. unique identifiers of the data items are stored. Since an ID may be implemented as a simple integer number, this aspect further minimizes the memory consumption of certain example embodiments.

Certain example embodiments also concern a computer program comprising instructions for implementing any of the above-described methods.

Lastly, also a system for processing a graph query is provided, wherein the graph query serves for retrieving data items from a data source by indicating at least a source node representing one or more source item types, a target node representing one or more target item types, and a plurality of edges between the source node and the target node, wherein each edge comprises one or more relation conditions, wherein each relation condition defines a mapping between items of one of the source item types and items of one of the target item types, wherein the system comprises:

a. means for selecting a first edge of the plurality of edges;
b. means for traversing the selected first edge from the source node to the target node in accordance with the one or more relation conditions of the first edge to produce an intermediate set of result items, wherein the intermediate set of result items comprises the items of the data source which belong to the at least one target item type and which fulfill the corresponding one or more relation conditions;
c. means for selecting a further edge of the plurality of edges;
d. means for traversing the selected further edge from the target node to the source node in accordance with the one or more relation conditions of the selected further edge, and for deleting items from the intermediate set of result items which do not fulfill the corresponding one or more relation conditions;
e. wherein the selecting a further edge of the plurality of edges and the traversing of the selected further edge from the target node to the source node is repeated for each further edge of the plurality of edges; and
f. means for returning the intermediate set of result items as the result of the graph query.

Further advantageous modifications of embodiments of the system of certain example embodiments are defined in further dependent claims.

3. SHORT DESCRIPTION OF THE DRAWINGS

Figure 2:
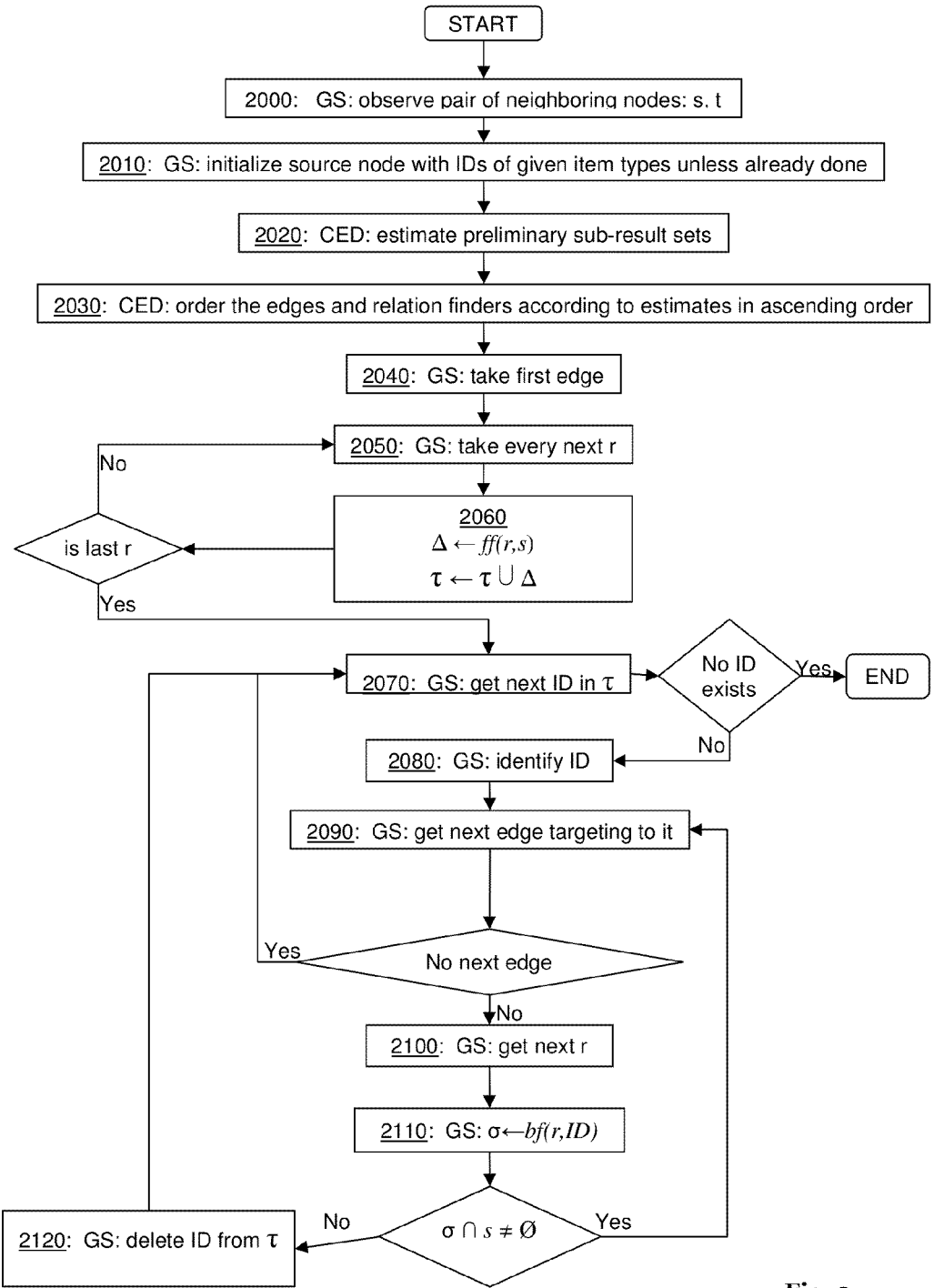
Figure 3:
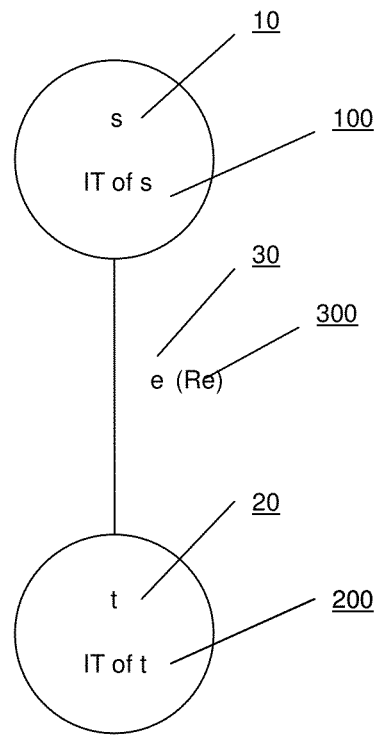
Figure 4:
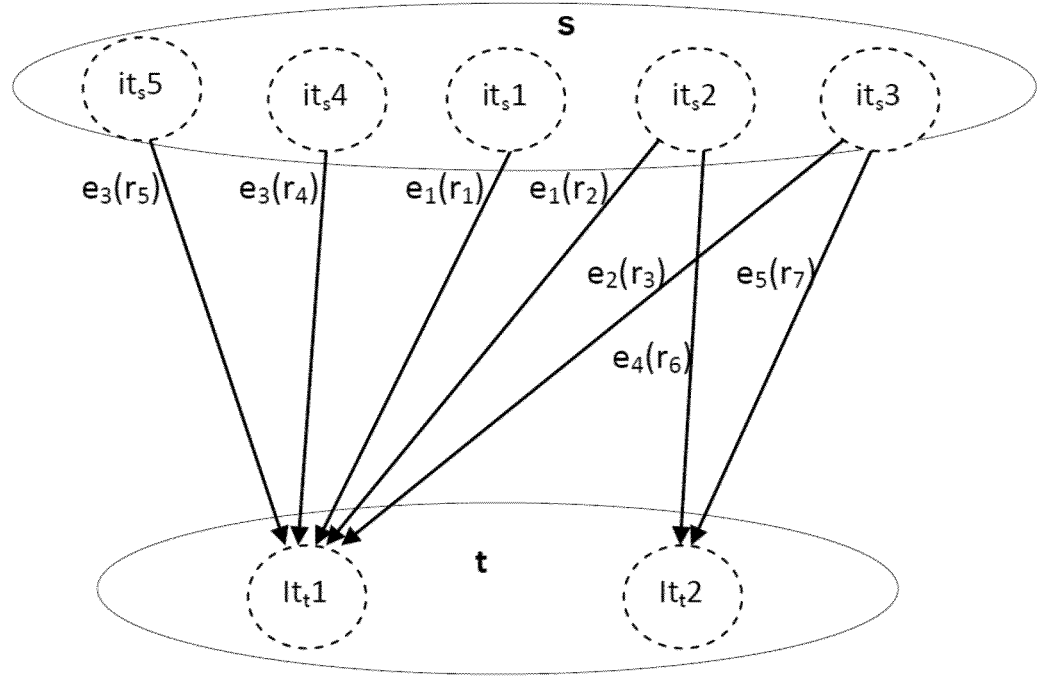
Figure 5A:
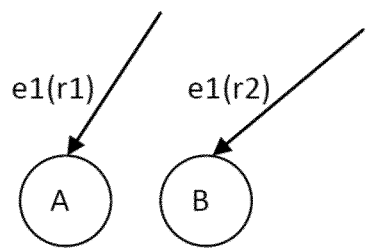
Figure 5B:
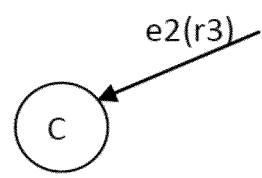
Figure 7:
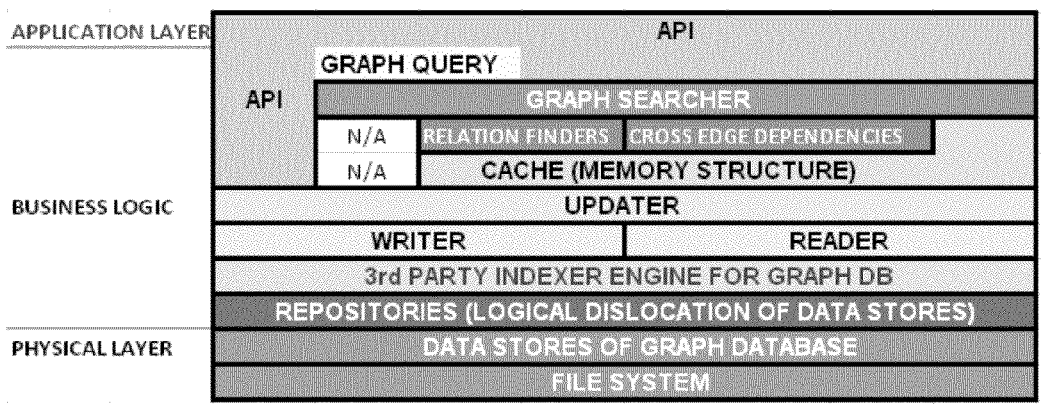
Figure 8:
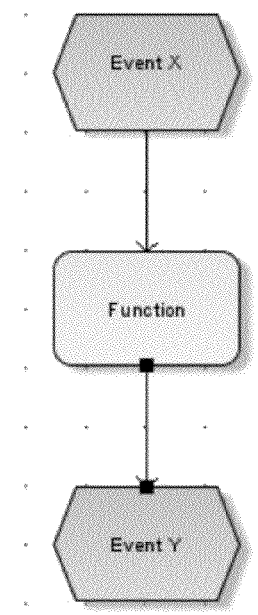
Figure 9A:
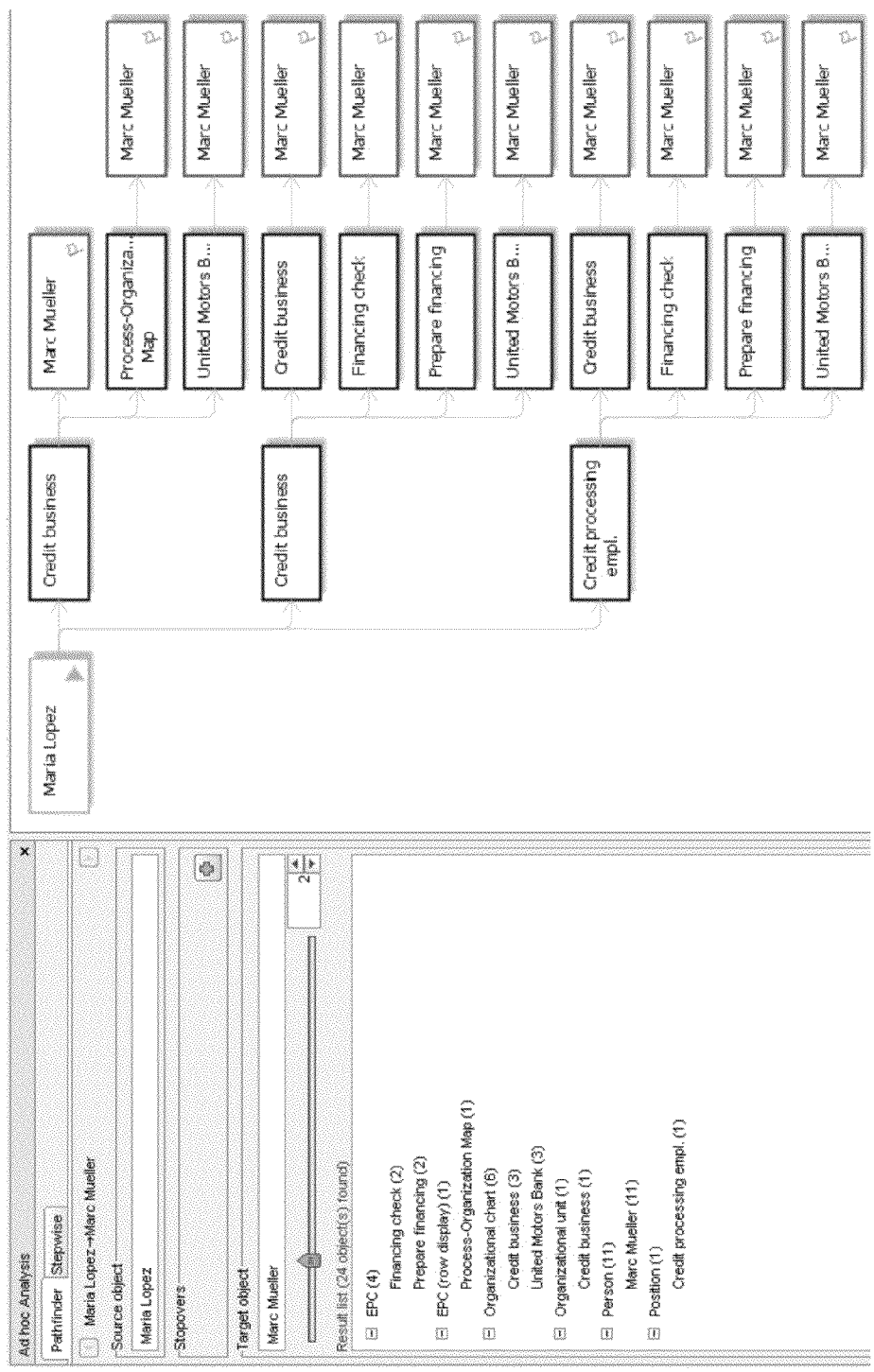
Figure 9B:
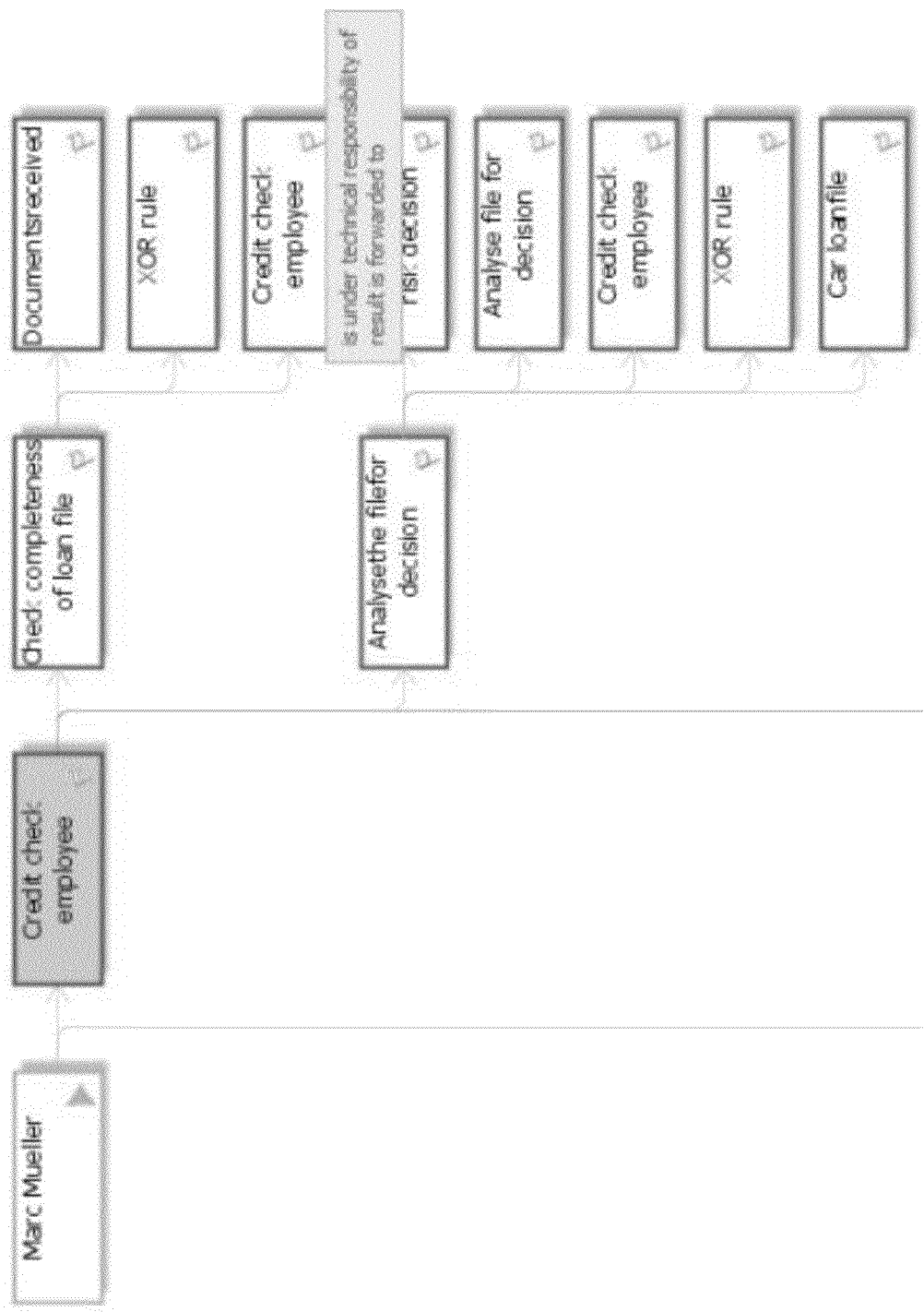

In the following detailed description, presently preferred embodiments are further described with reference to the following figures:

FIGS. 1-2: Flow charts illustrating a search algorithm according to an example embodiment;

FIG. 3: A conceptual view of two neighbouring nodes and an edge in-between;

FIG. 4: A conceptual view of two nodes with item types and multiple relations therebetween;

FIGS. 5*a*-5*b*: A conceptual view of a search algorithm according to the prior art;

FIGS. 6*a*-*d*: Query graphs and intermediate results of an illustrative example according to an example embodiment;

FIG. 7: A block diagram illustrating a system according to an example embodiment;

FIG. 8: An exemplary query graph according to an example embodiment;

FIGS. 9*a*-9*b*: Screenshots of exemplary query graphs according to an example embodiment;

FIG. 10: A preferred implementation of the forward filtering function in pseudo code according to an example embodiment; and FIG. 11: A preferred implementation of the backward filtering function in pseudo code according to an example embodiment.

4. DETAILED DESCRIPTION

Basic Concept
Basic Principle:

Certain example embodiments generally relate to graphs, and more particularly to graph computing, mapping neighboring nodes and reducing relations. The present innovation is particularly useful in graph query search machines that use graph data as well as in-memory and/or non-SQL solutions.

A graph is generally represented by sets of nodes (vertices) and edges interconnecting them. Although the principles of certain example embodiments will be described primarily with respect to the base of a graph, i.e. with respect to two neighboring nodes (source and target) and their interconnection, it will be appreciated that the present invention can be applied to any arbitrarily complex graph.

Conceptually, each node represents a container for one or more sets of data items from a data source. Although certain example embodiments will be explained hereinafter in relation to data items of a database, it will be appreciated that the data items may originate from any other type of data source, such as a file system, a cache, or a hardware or software sensor producing streaming data. In a preferred embodiment, each node comprises one or more sets of IDs (unique identifiers), with each ID representing a corresponding data item. In other words, an ID can be understood simply as a reference to an item (cf. also the glossary further below). Preferably, each node is further associated with one or more item types.

FIG. 3 conceptually illustrates two neighboring nodes s and t and an edge e inbetween. As can be seen, the nodes have IDs 10 and 20 and are associated with item types 100 and 200, respectively. An edge is defined as a relation between two neighboring nodes. The edge 30 has one or more relation finders Re 300 ("relation finders" will also be called "relation conditions" hereinafter). The direction of the edge, if any, in directed graphs is the same on the edge's relation finder(s) r. In non-directed graphs both directions are considered. In general, a relation finder r serves to map the item of the item type to another item. Circular dependencies with items and their item types are allowed.

Filtering Principles and Relations:

Preferably, the relation finders 300 have time invariant behavior while processing a complete graph.

In the case of a one-to-one mapping, a relation finder r 300 maps $id_s \in it_s$ to $id_t \in it_t$. The other case of a one-to-many mapping occurs when a relation has an item type and thus the item $it_r$, and the relation is an entity and has references to its item $it_r$ in the graph data. Then the following describes such a relationship: $(id_s, \mathcal{R}) \wedge (id_r, id_t) | id_s \in it_s \wedge id_t \in it_t \wedge id_r \in \mathcal{R}$. The specific $id_s$ is mapped to $\mathcal{R}$ of a set of $id_r$, where each is mapped to a different $id_t$.

In programming languages, this can be accomplished by very fast object-less maps. Such maps consume millions of map entries with a small memory footprint (as will be explained in more detail further below).

An edge 30 has a set of relation finders 300 (one at least), e.g. e(r1, r2, ... ). In the example of FIG. 4, which shows a practical use case of multiple related nodes and item types, the edge $e_1(r_1, r_2)$ splits to two connecting lines $e_1(r_1)$ and $e_1(r_2)$. Both propagate to the same item type $it_t1$, otherwise they would be processed independently. The direction in the graph for both $e_1(r_1)$ and $e_1(r_2)$ is the same. Similarly, the edge $e_3(r_4, r_5)$ splits to $e_3(r_4)$ and $e_3(r_5)$.

The IDs which are held by node s 10 and t 20 are logically grouped in sets of item types $it_s$ 100 and $it_t$ 200, respectively. Physically, the nodes may keep the IDs in one set and are able to identify the item type of a particular ID.

The basic principle of filtering is to intersect the intermediate products of edges 30 (set of IDs of same item type).

Comparison with the Prior Art Approach

As explained above, $e_1(r_1)$ and $e_1(r_2)$ belong to the same edge 30 with different relation finders 300. Processing this fusion in accordance with the prior art approach is illustrated in FIG. 5a. The outcome consumes much memory due to two sets of IDs, namely A and B of the same item type. Then both sets A and B are joined A←A∪B because both belong to edge $e_1$, and A is reused. Using BitSets in programming languages, the set A can be reused, since the assignment and union operation is optimized as one operation without any intermediate results and costly deletion of set content.

In the next step, the edge $e_2$ maps IDs of the same type as A. Therefore, the outcomes of $e_1$ and $e_2$ must intersect. New memory must be allocated for the set C and the intersection between A and C is performed as follows: A←A∩C, (cf. FIG. 5b).

In summary, this approach consumes five sets allocated in memory for $it_t1$ and two for $it_t2$. Thus, six sets are temporarily allocated in memory and shortly removed after one set is observed in the result of filtering. Moreover, this traditional approach may reach long execution times because of intersecting a set Y with any other previously intersected sets, e.g. X. The set Y may contain more redundant information than required by set X. This may result in a situation of generating redundant information in the set Y and that large set Y is traversed for matching any ID in a small set X.

Concept

In the following, an algorithm for processing a graph query according to a preferred embodiment will be described with reference to FIGS. 1 and 2.

Generally, the illustrated algorithm deviates from the prior art approach in that in the prior art approach, multiple relations lead to the creation of sets with various redundant data which do not match across the examining sets. Opposed to this approach, according to certain example embodiments only one edge is taken in "forward filtering" (see further below) and each ID is checked in "backward filtering" (see further below) whether it fulfills the relation conditions against the source node s across other relations. This way, redundant information during the backward filtering is minimized to a great extent, which improves performance and decreases the memory consumption (i.e. memory footprint) due to the usage of a single set in the outcome.

The following algorithm is preferably applied to each targeting item type $it_t$:

1. Initialize the source node with IDs of given item types;

Initially, the root node s of a graph is preferably associated with a set of IDs fetched from a cache. The associated set of IDs may be based on certain filtering criteria, or may include all IDs if the filter is unspecified. For example, the root node (note that each graph has exactly one root node) may have all employees with names James, where employees is the item type and James is the value for the attribute of name. All other source nodes (other than the root node) may be initialized based on information computed during the processing of previous pairs of nodes (see section "Preferred implementation" further below).

2. Initializing the target node is optional;

Certain example embodiments primarily concentrate on the processing of a pair of two neighboring nodes (i.e. source node and target node) in a query graph. Apparently, typical graphs include many source-target-node pairs structured in branches. Since in the graphs considered in certain example embodiments, two branches may join into one common target node, the first branch may initialize the common target node faster than the second branch. This is a completely adequate situation in the present algorithm and thus the first branch is simply fully processed as proposed by certain example embodiments, and then the second branch preferably uses the already initialized t. Processing the second branch is limited only to situations such as illustrated in FIG. 11 (described further below) and all of its edges (including the first edge) take place. Processing the first branch is general for all graphs and transcends the limited use in second branch 3. Mapping procedure:

4. Order the edges so that the first edge contributes to the target τ with a minimum population. Every next edge contributes with a bigger set of population, etc;

5. Store this ordering in memory. Repeat it for each $it_t$;

6. If the first edge has more than one relation finder with the targeting item type $it_t$, make a union among their forward filtering function ff( ) results into the targeting set τ;

7. After finished with all item types $IT_T$, continue with the following reduce procedure:

8. Iterate over the IDs which are in τ and fast identify its item type $it_t$;

9. Use the previously created order of edges per item type;

10. Iterate over the ordered edges starting at the second edge (if any) in that order;

11. Perform backward filtering, function bf( ) from the target ID to the source, which results in a candidate of ID in the source item type.
12. If the candidate ID exists in the given source, continue with step 10; Otherwise delete the target ID from τ;
13. τ is the resulting set, where t is associated with τ after the above algorithm has finished.

More generally and regarding the direction of the mapping of IDs from an s to a t node, the backward filtering function bf( ) is inversed with respect to the forward filtering function ff( ) (see section "Filtering principles and relations" further above for the principles of filtering using relation finders).

In FIG. 3, the order of the relations is determined by a cost function. For $it_t 1$, the relation $C(r_1, r_2) < C(r_3) < C(r_4, r_5)$ is supposed, and for $it_t 2$ the relation $C(r_6) < C(r_7)$. The form of the cost function may be anything such as computational complexity and/or estimated population of IDs in a t node filtered forward from s to t via a particular relation. Since it is difficult to determine the relations between these cost functions before starting the present algorithm, the results of the cost functions may be estimated. For example, the estimation may be performed according to the amount of items in s per particular item type $it_s$ (as will be explained in more detail further below).

In step 2080 (cf. FIG. 2), the algorithm preferably fast identifies item types in τ which is necessary in the backward filtering of step 2110. Since the backward filtering is mostly performed in memory, identifying the item type needs to be done in memory as well. It should perform as fast as the inversed mapping in step 2080 and even faster.

One way of implementing this behavior in Java code is to design object-less collections mapping a Java enum to the primitive type of integer. This means that the enum represents the item type, and the primitive type of integer represents an ID as a number. Using pre-allocated Java int arrays, enum ordinals (see java.lang.Enum#ordinal( )) and encoding several values in a single array element, the performance can be improved and memory consumption can be drastically decreased. When frequently used lookup operations are compiled by a JIT compiler to a native code, the lookup operations concern (ca. 21 machine cycles) only ALU operations without divisions and object creations. Using a 3 GHz CPU, the item type lookup in such a collection/map took 7 nano seconds.

Estimations

Estimations are an optional feature of certain example embodiments, which can considerably increase the performance of the inventive search algorithm.

Again referring to FIG. 4, in the depicted example all source item types 100 $it_s 1$ to $it_s 5$ are mapped to the target item type 200 $it_t 1$. Further, the source item types 100 $it_s 2$ and $it_s 3$ are mapped to the target item type 200 $it_t 2$. Although the mapping from source s to target t can be one-to-many, due to simplicity the example only considers one-to-one in this mapping estimation.

In the following, the size of the joined sub-results of the relation finders r1 and r2 are estimated, since they both belong to the same edge e1. This size estimate is simply determined by $it_s 1$ and $it_s 2$, and is computed as the sum of the amount of items in $it_s 1$ and $it_s 2$.

A similar estimation is performed with $it_s 4$ and $it_s 5$. Then, the edge e2 and the single relation finder r3, and therefore the estimation would result in the population of items after r3 as the same as the population of $it_s 3$.

Although this estimation is not precise, the relation between the size of sub-results, such as $C(r_1, r_2) < C(r_3) < C(r_4, r_5)$ is what counts. This is the only knowledge required, and the real populations are not needed.

This estimation is preferably not adjusted, otherwise it would be extremely difficult to make it considering a lot of tuning, testing, providing guarantees, and a fallback.

Since the data is in typical scenarios basically stochastic, any prediction may serve as an alternative means for calculating estimates. For example:

A process which is learning from previous similar sub-graphs and filters on those nodes in the particular sub-graph;

A Fuzzy Logic controller estimating results: Since we have only information of the exact size of each $it_s$, filters on the target node and the type of relation (finder), we can build a surface for Fuzzy Logic based on this information. There, a selectivity of the filter would play a role in the input of the Fuzzy Logic controller, and the output thereof would determine how to which degree the size of the result $it_t$ relates (greater/same/smaller) to the size of $it_s$ (a growth of population target over source). From this, one can build suitable Membership Functions;

Probabilistic approach: For instance, a node's filter may have a selectivity to select only parents within a range of years from the database. The resulting number of children for these parents can be estimated based on demography, e.g. by taking some representative maximum and minimum values of fertility in the history, or applying membership functions, and historical density of parents in examined set.

The Impact of Missed Estimates:

Non-optimal estimated results would result in the forward filtering operating being performed on a set of IDs which is greater than the really smallest set, which would in turn result in a certain slow down.

However, applicant has observed that significant variations of input sets would win even with badly estimated output sets, since there is actually no need for the real size of each result set. On the contrary, what is required is only the relation between the sizes.

For example, when the estimation results in A=9, B=2, C=12, but in reality the sizes are A=3, B=2, C=20, then the relation B<A<C is still correct. This is enough for the present algorithm to operate efficiently, because B is the minimum. The key is to choose the minimum population of IDs of candidates which contribute to the result. If the estimates would mistakenly identify the order as B<C<A, the system may slow down, but the algorithm has still a lot of benefit over the conventional approach described above. If the estimation is even more inaccurate, e.g. if A is mistakenly considered as the minimum, the algorithm would slow down by 3/2. This means 50% extra execution time, but this is still better than the traditional approach, where the small performance was determined by creating all intermediate result sets. In the algorithm according to certain example embodiments, only one set of IDs is created at all.

Preferred Embodiment of the Graph Query Processing Algorithm

In the following, a preferred embodiment will be described with reference to the flow charts illustrated in FIGS. 1 and 2. FIG. 1 illustrates the main control flow, which includes calls of the subroutine illustrated in FIG. 2. The prefixes in the steps of the flow charts of FIGS. 1 and 2 denote the responsible system components which execute the respective command (cf. the glossary further below).

The method starts at step moo (cf. FIG. 1), where the query graph to be processed is received as an arrangement of nodes and edges connecting the nodes. In step 1010, a command for creating the graph query is received, and the search operation is invoked in step 1020. Step 1030 includes loading/updating a database index snapshot into the cache from a reader. Preferably, the "reader" is a (software) component that can read data from the corresponding snapshot of the database index. The snapshot is preferably a physical file of database indexes related to the particular search operation. The IDs are frequently used from the cache. Other information, such as item attributes, may be loaded through the reader which is less frequent but very costly in memory.

In step 1040, the relation finder instances are created/updated. Preferably, the relation finder instance(s) is/are determined upon the filter in the operation FilterGraph#addEdge (see below). The filter preferably contains the information of the relation, which in ARIS can be e.g. a connection, an assignment, and/or an occurrence. Then this information is necessary in order to fetch IDs of a particular snapshot of a database index of relations from the database into the cache. The relation finders are always unique in memory. They are updated through the writer (see section "preferred implementation" further below) in new instances, if and only if the database is updated. When a new search operation is about to start and the database has updated the relations, new instances of the relation finders are created referring to the old instances having the major IDs of relations in the cache. The new instances have only meta-information determining which old records have been deleted and which new ones have been added. Then, the search operation is invoked. Accordingly, the search operation operates on a steady snapshot of database indexes.

The IDs for QueryNode and QueryEdge (see below) are also steady while the search operation is performed. Other parallel search operations may use other copies of IDs.

In step 1050, an internal query graph (labels "Graph Query" hereinafter) is created with vice-versa relations of nodes and edges. The Graph Query is preferably part of an API as an entry point to the user of certain example embodiments, and has object reference types FilterGraph, INodeResult and an abstract Filter. The FilterGraph preferably includes the following main operations:

addNode(nodeName, filter)
addEdge(edgeName, s, t, filter)

The resulting INodeResult corresponds preferably to data of a node structured in the FilterGraph, with the following operations:

getAll( ):IResultItem
getLoadedSize( ):int where the IResultItem is the recorded data of the item in the database related to the ID, and has the following operations:

getItemType( )
getAttributes( )

The internal QueryEdge has preferably the following main operations:

getSource( ):QueryNode
getTarget( ):QueryNode
getRelationFinders( ):RelationFinder[ ]

and the internal QueryNode has the following operations:

getIds( ):BitSet
addEdge(QueryEdge).

After the internal query graph has been created in step 1050, for each source node 10 (cf. FIG. 3) a corresponding target node 20 is determined in step 1060 and the method performs the process of FIG. 2 for the given pair of source and target node. In step 1070, the IDs of the target nodes 30 in the graph query are updated by the new targeting set $\tau$ in each execution of the flow chart of FIG. 2.

Referring to FIG. 2, the process operates on a given pair of neighbouring nodes s and t, i.e. a source node 20 and a target node 30 (cf. step 2000 in FIG. 2). In step 2010, the source node is initialized with IDs of the given item types, unless already done. As already explained, this means that the root node in the graph must be initialized, while other (non-root) nodes are preferably automatically initialized by using information from previous nodes. In other words, the target node of a run i is preferably used as the source node in the subsequent run i+1. For example, in a graph with three branches, the chain of the nodes would be: (s1 is root node)→(t1==s2)→(t2==s3)→(t3), where s and t are a pair of nodes used in certain example embodiments.

During the so-called "mapping procedure" (see section "Concept" further above), preliminary sub-result sets are estimated (cf. step 2020) and the edges (and preferably also the relation finders of each edge) are ordered according the estimate(s) in ascending order (cf. step 2030). Generally, the edges are preferably ordered such that the first edge contributes to the target set $\tau$ with minimum population. As already explained above, this ordering is preferably stored in memory and repeated for each $it_t$.

Then, the first edge is taken (cf. step 2040). For every relation finder of the first edge (cf. step 2050), an intermediate set is obtained in accordance with the forward filtering function and the final result set $\tau$ is set to the union of the final result set with the intermediate set (cf. step 2060). In other words, if the first edge has more than one relation finder with the targeting item type $it_t$, a union is made among their forward filtering function ff( ) results into the targeting set $\tau$.

After the process is finished for all item types $IT_t$, the process continues with the so-called "reduce procedure":

At step 2070, the process iterates over all IDs in the targeting set $\tau$, and in step 2080 the respective ID is identified, i.e. its item type $it_t$ is preferably fast identified. Using the previously created ordering of the edges per item type, the process iterates over the ordered edges starting at the second edge (cf. step 2090). The next relation finder is fetched in step 2100 and the backward filtering is performed using the backward filtering function bf( ) from the target ID towards the source, which results in a candidate of ID(s) in the source item type (cf. step 2110). If the candidate IS exists in the given source, the process goes back to step 2090. Otherwise, the ID is deleted from $\tau$ (cf. step 2120).

After the above-explained process has terminated, $\tau$ is the resulting set, i.e. it comprises the IDs of the data items that fulfill the query. Although the present algorithm has been described as operating on IDs of data items of the underlying database, the skilled person will appreciate that the concept underlying certain example embodiments may also operate directly on the actual data items themselves.

ILLUSTRATIVE EXAMPLE

In the following, it will be explained how the filtering of IDs is performed from a source node to a target node, as well as the way to intersect the sets of IDs into the target result without computing intermediate subsets.

The present example uses the proposed algorithm of certain example embodiments, where the input graph represents a query for answering the following question:

"Which sons of the Presidents and IT-leaders have names that appear in the 200 most common names?"

Figure 6A:
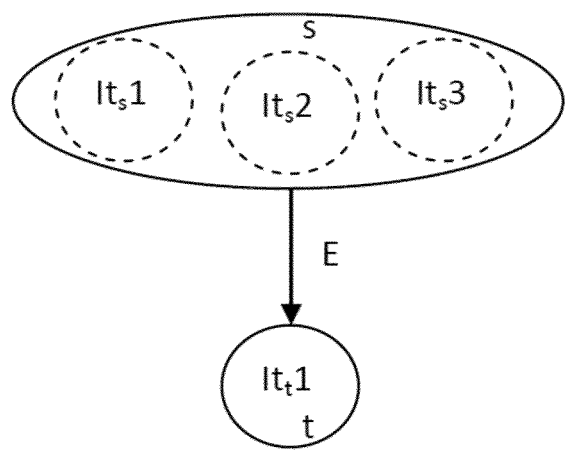

This query has two nodes, where the source node 10 has three item types 100, namely "IT Leaders", "US presidents", and "Most Popular Names". The target node 20 has one item type 200, namely the "names of children". FIG. 6*a* illustrates a conceptual representation of the above-explained query graph, and FIG. 6b illustrates how said query graph will be decomposed.

Figure 6B:
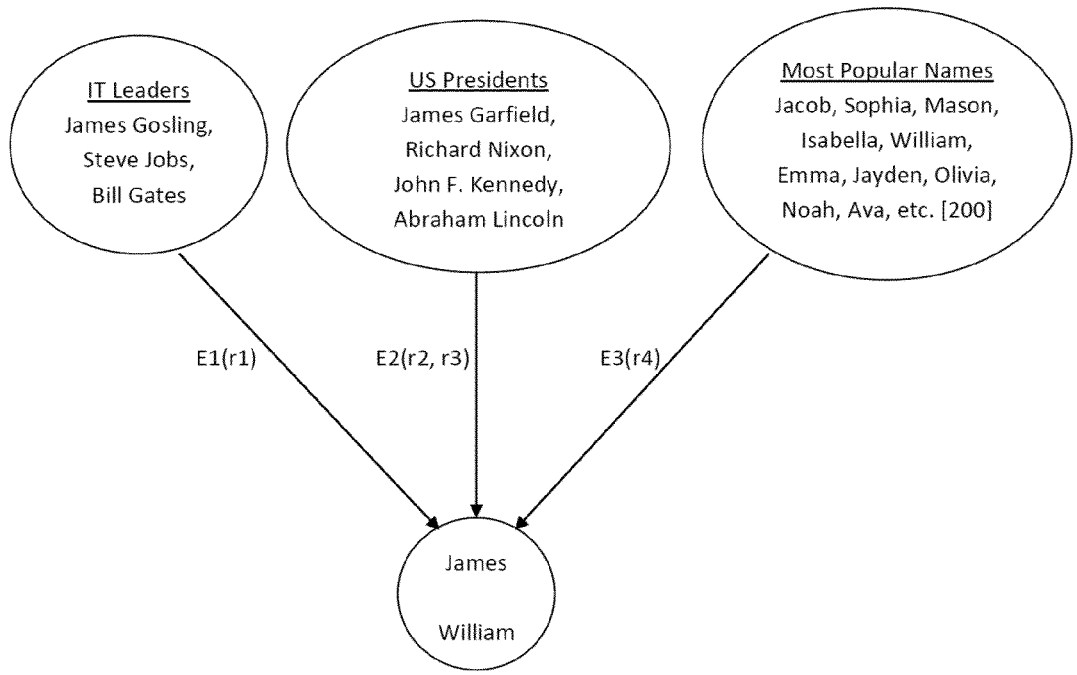

As can be seen in FIGS. 6a and 6b, the source node of the query involves two item types of people and a list of most popular names. "IT Leaders" is the first item type $it_s1$. "US Presidents" is the second item type $it_s2$. The list of names "Most Popular Names" is the third item type $it_s3$. The target node on the bottom of FIG. 6b shows two names ("James" and "William") as the final result τ of the present algorithm.

With respect to the edges 30, FIG. 6b illustrates three edges 30 E1, E2 and E3. E1 and E3 each have one relation finder/relation condition 300, while E2 has two relation finders. More precisely, relation finder r1 maps a name of "IT Leaders" to its children. E2(r2) maps a president to its children names. The edge E2 with relation r3 represents a mapping between president and its wife's first name. These two make a union. E3(r4) is an identity mapping, since only names are compared.

In the following, the organization of an underlying exemplary database will be described, on which the graph query is to be executed. It is assumed that there is a database index for names, another database index for surnames, and middle names as well. If possible, certain example embodiments rather work with IDs than literals. If a more complex filtering is required, e.g. the number of vowels in the literal, then an additional computation may be performed by the relation finder on an edge or filter on a target node.

The following table represents the one-to-many relation finder r1:

| IT Leaders | children |
|---|---|
| James Gosling | James, Nicola, Lisa, Louise |
| Steve Jobs | Lisa Brennan, Reed, Eve |
| Bill Gates | William H., Mary Maxwell |

The mapping of relation finder r2 is as follows:

| president | children |
|---|---|
| James Garfield | Eliza Arabella, Harry Augustus, James Rudolph, Mary, Irvin McDowell, Abram, and Edward |
| Richard Nixon | Tricia, Julie |
| John F. Kennedy | Arabella, Caroline B., John F., Patrick B. |
| Abraham Lincoln | Robert, Edward, William, Tad |

The mapping of relation finder r3 is as follows:

| president | wife |
|---|---|
| James Garfield | Lucretia Rudolph |
| Richard Nixon | Pat Ryan |
| John F. Kennedy | Jacqueline Bouvier |
| Abraham Lincoln | Mary Todd |

As explained above, the mapping of relation finder r4 is a simple identity mapping.

First of all, the inventive algorithm should order the relation filters from the smallest contributor to the biggest. Since there are only three IT Leaders ($it_s1$), four presidents ($it_s2$), and 200 popular names ($it_s3$), the order of the relation finders is as follows: r1, (r2, r3), r4. Note that r1 is connected to $it_s1$, r2 and r3 are connected to $it_s2$, and r3 is connected to $it_s3$. A preferred implementation of certain example embodiments orders the relation finders according to the source population size in a particular item type (see section "Estimations" further above). Other estimations may be suitable as well (see also section "Estimations" further above).

Figure 6C:
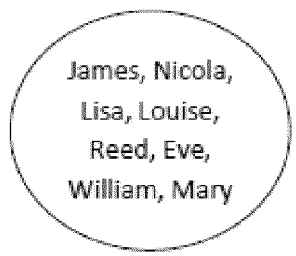
Figure 6D:
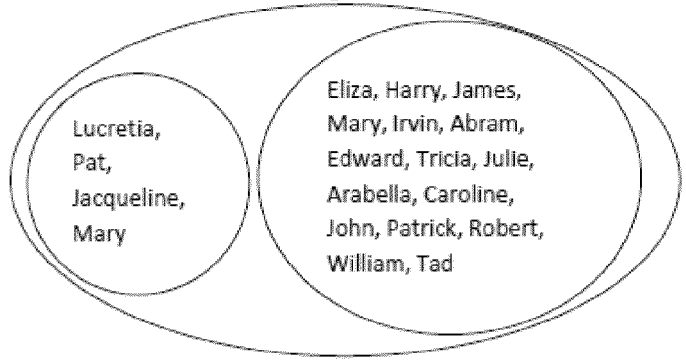

The intermediate sub-result set related to the IT Leaders is illustrated in FIG. 6c. Note, however, that it is not computed by the present algorithm like this, but is illustrated only to facilitate the understanding. As can be seen, the intermediate sub-result comprises eight items. The intermediate sub-result set from presidents is composed of two subsets (cf. FIG. 6d). The first subset has four items with the names of wives, the second subset encapsulates the names of the children. In summary, this set has 20 items. The last set comprises the 200 most popular names (not shown).

All of these intermediate sub-result sets order the originator from smallest to biggest. The order of the relation finders is as follows: r1, (r2, r3), r4. This means that the estimation explained above reached the expected order of item types as follows: $it_s1$ (IT Leaders), $it_s2$ (US Presidents), $it_s3$ (Most Popular Names). Accordingly, the estimation considering the size of population in the source node per item type is fast and costless and produced the expected order in this example. Other more accurate estimations would just consume additional computing power, while delivering limited benefits.

Now that the order of the relation finders and item types is determined, the present algorithm takes all items which belong to $it_s1$ and performs a mapping via the above-depicted table relating to r1. The result is (James, Nicola, Lisa, Louise, Reed, Eve, William, Mary), which is the preliminary result of the forward filtering. This set is smaller than the other two candidate sets added together.

Note that the forward filtering is only applied to the first edge of the query graph. For the further edges, the above-described backward filtering is applied. Thus, the present algorithm takes the first name 'James' of the preliminary result set and applies the backward filtering according to the inversed mapping of r2. This way, the algorithm finds out that the name 'James' is related to James Rudolph as the child of James Garfield. Since r2 and r3 are present in the same edge E2, they work in union and there is no need to proceed with the inversed r3 because 'James' already successfully satisfied E2(r2). This evaluation of the item 'James' continues through the next edge E3. E3 has the relation finder r4 as an identity and the name 'James' appears in the list. Thus, 'James' is determined to be an item of the final result of the query.

Another item in the preliminary result (also referred to as "intermediate set of result items") determined by the forward filtering step is 'Mary'. Here, the algorithm proceeds in the same way except for the last stage, where Mary does not exist in the most popular names and thus must be deleted from the preliminary result.

Another item in the preliminary result is 'Nicola'. Here, the algorithm determines during the backward filtering that this name does not exist in the column of children of r2 and therefore no deletion possible yet. The algorithm first has to check the appearance of wife in r3 as well. This name is not a wife in r3 and can be deleted from the preliminary results and there is no need to proceed with E3(r4). The principle of the algorithm of certain example embodiments is then applied to all of the remaining items in the preliminary result.

Preferred Implementation

A preferred implementation follows the basic concept of certain example embodiments. The only unknown information is the number of IDs per item type in the target node t at the time the algorithm is applied to a pair of nodes s and t. Finding the exact size of t before the algorithm has finished is practically impossible. Therefore, the size is preferably estimated from the outcome of previous pairs of nodes in the graph connected to s. Accordingly, one embodiment of the present algorithm computes the exact number of IDs per item type in t after the algorithm finished. This information can then be used in the processing of the next node connected to the node t, in which t becomes s on the next pair of nodes in this iterative approach.

Exemplary System Implementing the Inventive Algorithm:

As shown in FIG. 7, the exemplary system is organized in three main layers (application layer, business logic and physical layer). The bottom part (physical layer) is responsible for storing and indexing items according to their attributes and IDs for fast retrieval. Every item may have miscellaneous attributes, unlike in RDBMS. The top part (application layer) comprises a high-level abstraction that serves for creating a Graph Query object model, launching the search operation, and updating the graph database. The "API" shown in FIG. 7, as a high-level abstraction, isolates the implementation of the searcher component from the surrounding parts which can access the searcher. The "Graph Query" shown in FIG. 7 is a graph with nodes and edges created in runtime upon user-defined search criteria. Typically, the filters (search criteria) applied to nodes and edges are general, e.g. in ARIS BPML a certain Event X→Function Event→Y (cf. FIG. 8). In the underlying ARIS database, this may result in finding thousands of records. Accordingly, the searcher in this scenario will match the DB with the query graph and will find all occurrences of this matching. Apparently, the graph and search criteria may be chosen much more complex than in the depicted scenario, which only serves as an illustrative example.

As the person skilled in the art of graph databases will appreciate, the query is both the input of the present inventive algorithm, and also the container of the final result. In other words, the inputted query graph is filled with the result items during execution of the inventive algorithm. The result is thus present in the Graph Query object model after the search has finished. This object model in the s/w layer handles all information regarding each item in the nodes, edges, filters and/or references to item IDs (real ID in DB), relations (a path along which a node is connected to another node) and/or item attributes (such as name, surname of person, date, arity, etc.).

Referring back to FIG. 7, the "Graph Searcher" component preferably operates with a costless database index snapshot which is asynchronously provided by the "Updater" thread. Detailed information (item attributes) which is more costly to load and store in the "Cache" is read from a physical data snapshot via the "Reader". The "Cache" preferably comprises only costless data such as IDs (e.g. a number representing an identifier of an item). Any updates of the graph data is performed by the "Writer" and the underlying layers. For the user, the update operation including deletions is accessible through the "API". The "Cache" stores IDs of every item type in the snapshot. The snapshot is preferably created at the time the user has started the search operation via an "API" call (such as #search). The snapshot basically is inherited from previous times and updated by intermediate changes made in the meantime. Accordingly, such a creation of a snapshot is costless in terms of execution time and memory management.

As already explained above, the "Graph Query" in FIG. 7 is an object model of the query. A similar model (a copy is preferably stored internally) comprises information such as:

Every query node in the Graph Query (see API) is associated with the final population of IDs per item type. This information (estimates) is stored in the internal copy of the query node as well as in runtime and changes accordingly only by the search engine as the result;

Every query node in the Graph Query (see API) references to edges of the Graph Query;

Every internal query node references to internal edge(s), and opposite;

Nodes and edges have descriptions such as names (for debugging purposes), and/or filters. In case of edges, the filters determine the relation filters. In case of nodes, the filters determine whether the particular item satisfies filter criteria such as date, name, etc.;

Internal query nodes are associated with initial sets of ID (optional)—mostly top nodes in the query graph.

As shown in FIG. 7, the present algorithm resides preferably in the components "Graph Searcher", "Relation Finders" and "Cross Edge Dependencies". Preferably, the Graph Searcher comprises the core of the present algorithm, and may also comprise other algorithm(s) which control the entire Query Graph computation. Also, this algorithm mainly resides there and concentrates on small parts of the query graph, namely two neighboring nodes connected by a single or multiple edges. Since such a node may contain many item types, the internal query graph can be split accordingly. Then, the pair of nodes becomes just another sub-graph, and the present algorithm takes care of that sub-graph. The Cross Edge Dependencies component is responsible for estimations, ordering edges and relation finders according to which the result is computed by the Graph Searcher. With reference to the numbered list shown in section "Concept" further above, steps 1, 2, 6, 7, 8, 9, 10, 11 and 12 correspond to the Graph Searcher, and steps 4 and 5 correspond to Cross Edge Dependencies component. The Relation Finder components are used by both Graph Searcher and Cross Edge Dependencies.

In summary, the layered diagram of FIG. 7 describes a superset of modules and a hierarchy of dependencies. In other words, the Graph Searcher uses the Relation Finders and the Cross Edge Dependencies. The Relation Finders are also used by the Cross Edge Dependencies. The Graph Searcher also uses the Cache. The Relation Finders use the Cache while being instantiated into memory. Previous copies of the Relation Finders is in use by new Relation Finders.

Illustrative Example in ARIS

FIG. 8 explained above illustrates a simple example of a graph query. Accordingly, using e.g. the product ARIS of applicant, the user may choose two names as nodes from ARIS' underlying graph database, where the intermediate two nodes are unknown and may represent arbitrary content. Accordingly, the search criteria for filters in the corner nodes are that the attribute name should match the given names. The result graph without multiple relations may then look like illustrated in FIG. 9a. In this scenario, the present algorithm of certain example embodiments cannot be used, because the query graph represents a tree. This means that there is no target node connected to more than one ancestor.

FIG. 9b illustrates an example suitable for being processed by the proposed algorithm. It represents a decision making of taking a car loan. Each box except for the box "Marc Mueller" represents one decision. The "Credit check employee" on the right hand side is present in two boxes with the same ID. Thus, this is the same instance/node. This means that the node "Marc Mueller" is connected to "Credit check employee" via two paths.

The first path from left to right is as follows:
1. "Marc Mueller"
2. "Credit check employee"
3. "Check completeness of loan file"
4. "Credit check employee" with ID:1

The second path is:
1. "Marc Mueller"
2. "Credit check employee"
3. "Analyse the file for decision"
4. "Credit check employee" with ID:1

The node having an instance "Credit check employee" is connected to an ancestor node having "Check completeness of loan file" and "Analyse the file for decision". This is an example with multiple relations, which represents the state after filtering.

Preferred Implementation of Forward Filtering

FIG. 10 illustrates a preferred implementation of the forward filtering in pseudo code. First, the buffer of target IDs (i.e. the final result set τ) is initiated as an empty set (cf. line 1). The first loop (line 2) iterates over all item types of the target node. In the individual iteration, the item type is unique and appears once. The second nested loop (line 3) iterates over edges or a subset of edges. An edge appears in such a subset if and only if it has at least one relation whose end or beginning belongs to the examined item type of the target $it_T$. Then, the opposite part of the relation must belong to the item type of the source node. This subset is ranked according to the magnitude of IDs it could provide in the target if a filtering was performed on it. The smallest contributor appears first.

Only the first iteration is performed (line 4). The edge with the smallest contribution is processed in the next nested loop (line 6). That loop iterates over all relation finders (simply relations) and attempts to map the source IDs to target IDs (line 7). There should be at least one relation r in the edge e. The target IDs are collected in the τ buffer (line 8). After the loop finished, we found a number of IDs added per item type. This is the update of statistics (line 10). After this process has finished, the IDs in the τ buffer will be evaluated using the backward filtering described below.

Preferred Implementation of Backward Filtering

FIG. 11 illustrates a preferred implementation of the backward filtering in pseudo code, which is executed after the forward filtering took place. In line 1, the code again iterates over the target item types. The same subset of edges is examined as it was in the forward filtering, however, starting at the second edge in that set (if any) (lines 2 and 3). The next nested loop iterates over r relations (line 5) and attempts to map the opposite direction. Creating a kind of set of intermediate IDs as described in line 6 may not necessarily happen. The lines 6 and 7 only express that the backward filtering attempts to find out if an item $it_T$ in the τ buffer is related to any ID in the source node. If it is related, then the control flow of the code continues (line 8), otherwise the target ID is deleted from τ (line 12). If the virtual mapping exists, the next iteration (if any) in the loop (at line 2) is performed. So, the next edge is again examined until one of two things happens:

all the loops are performed, the last edge is successfully examined and the particular target ID remains unchanged in the τ buffer; or the target ID is deleted (line 12) from the τ buffer because it cannot be mapped back to the source node, thus the condition (at line 7) is not satisfied. The next loop does not proceed (see line 17).

Summary

The algorithm of certain example embodiments can be advantageously applied to a graph's nodes with more than one incoming relation. The node is supposed to intersect the outcome of each relation. Intersecting large sets is time consuming. The inventive algorithm takes the expected smallest set of a relation as the outcome of (one-to-one or one-to-many) mapping one set to another. This is done for each valid entry in that smallest set via backward filtering using the next larger expected result (a set of bigger redundancy) and so on. This avoids that the overall result sets have to be computed at all, but only the expected smallest result set. This leads to a situation of both minimum memory footprint and gained performance. While the algorithm of certain example embodiments was explained in connection with a directed graph with one direction, additionally the dependencies between entries in related sets and their population can be traced up.

In summary, certain example embodiments propose an efficient method to transverse a graph stored in a database, revealing the different relations between nodes in the graph. By utilizing a bidirectional approach and a rough estimation of the outcome, the number of sets to be allocated in memory for the querying process is dramatically reduced. This way, certain example embodiments provide a very significant optimization in graph searching.

At the core of the present intention is an algorithm which provides an optimal filtering in graph data with multiple edges, which solves the problem of both memory footprint and performance. In other words, a minimum of memory footprint with a maximum of performance is achieved. The algorithm finds graph results according to a specified graph-based query with minimum computation and memory costs.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium. For instance, the example queries and/or algorithms described herein may be executed in whole or in part by at least one processor of a computer system. The data generated during and/or as a result of the querying may be stored in any suitable transitory or non-transitory computer readable medium. Query and/or algorithm input may be provided by a user through an appropriate computer system terminal or other input device, from data stored in a computer readable medium, etc.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Glossary

ID The reference to an item
id The same as "ID" in equations (not matrix)
$id_s$ The id in node s
$id_t$ The id in node t
$id_r$ The id in the relation handled by a relation finder
it The item type
$it_s$ The item type associated with a source node
$it_t$ The item type associated with a target node
$IT_s$ The set of $it_s$ IT_t The set of it_t
s The set of IDs in the source node which belong to the given item type. Represents the source node.
R The set of (relation ids) id_r which relates a particular id_s to a set of id_t via the same size |R| of set R, or in the opposite direction
t The set of IDs in the target node which belong to the given item type. Represents the target node.
f The filter on a node or an edge
e The edge
r The relation finder which belongs to the edge
R The set of relation finders
R_e The set of relation finders which belong to the given edge
C The cost function. Helps determining the order of relations.
τ The targeting set which is associated with t
API Application programming interface
CED Cross Edge Dependencies
GS Graph Searcher
GQ Graph Query
U Updater

What is claimed is:

1. A computer-implemented method for processing a graph query in connection with at least one processor of a computer system, wherein the graph query serves for retrieving data items from a data source by indicating at least
   a source node representing one or more source item types,
   a target node representing one or more target item types, and
   a plurality of edges between the source node and the target node, wherein each edge comprises one or more relation conditions, wherein each relation condition defines a mapping between items of one of the source item types and items of one of the target item types,
   the method comprising:
   (a) selecting a first edge of the plurality of edges;
   (b) traversing the selected first edge from the source node to the target node in accordance with the one or more relation conditions of the first edge to produce an intermediate set of result items, wherein the intermediate set of result items comprises the items of the data source which belong to the at least one target item type and which fulfill the corresponding one or more relation conditions;
   (c) selecting a further edge of the plurality of edges;
   (d) traversing the selected further edge from the target node to the source node in accordance with the one or more relation conditions of the selected further edge, and deleting items from the intermediate set of result items produced in (b) which do not fulfill the corresponding one or more relation conditions;
   (e) repeating (c) and (d) for each further edge of the plurality of edges; and
   (f) returning the intermediate set of result items as the result of the graph query processed by the at least one processor.

2. The method of claim 1, wherein the selected first edge comprises a plurality of relation conditions, and wherein (b) comprises producing the intermediate set of result items as the union of the results of each relation condition.

3. The method of claim 1, further comprising performing (c)-(e) iteratively for each item in the intermediate set of result items.

4. The method of claim 1, wherein selecting a first edge of the plurality of edges in (a) comprises selecting the edge which, when traversed in (b), is expected to result in a minimal intermediate set of result items.

5. The method of claim 4, wherein the selected edge is the edge which is connected to the least amount of source items.

6. The method of claim 1, wherein the graph query indicates a target node comprising a plurality of target item types, and wherein (a) and (b) are performed iteratively for each of the plurality of target item types, so that the intermediate set of result items comprises the items of the data source which belong to any of the plurality of target item types.

7. The method of claim 6, further comprising performing (c)-(e) iteratively for each of the plurality of target item types.

8. The method of claim 1, wherein the intermediate set of result items stores IDs representing the respective items in the data source.

9. A non-transitory computer readable storage medium tangibly storing a computer program comprising instructions that, when executed, implement the method of claim 1.

10. A computer system for processing a graph query, wherein the graph query serves for retrieving data items from a data source by indicating at least
    a source node representing one or more source item types,
    a target node representing one or more target item types, and
    a plurality of edges between the source node and the target node, wherein each edge comprises one or more relation conditions, wherein each relation condition defines a mapping between items of one of the source item types and items of one of the target item types,
    wherein the system comprises:
    processing resources including at least one processor and a memory, the processing resources cooperating to at least:
    select a first edge of the plurality of edges;
    traverse the selected first edge from the source node to the target node in accordance with the one or more relation conditions of the first edge to produce an intermediate set of result items, wherein the intermediate set of result items comprises the items of the data source which belong to the at least one target item type and which fulfill the corresponding one or more relation conditions;
    select a further edge of the plurality of edges;
    traverse the selected further edge from the target node to the source node in accordance with the one or more relation conditions of the selected further edge, and for deleting items from the intermediate set of result items which do not fulfill the corresponding one or more relation conditions;
    wherein the selection of a further edge of the plurality of edges and the traversal of the selected further edge from the target node to the source node is repeated for each further edge of the plurality of edges; and
    wherein the processing resources are further configured to return the intermediate set of result items as the result of the graph query.

11. The system of claim 10, wherein the selected first edge comprises a plurality of relation conditions, and wherein the traversal of the selected first edge from the source node to the target node includes producing the intermediate set of result items as the union of the results of each relation condition.

12. The system of claim 10, wherein the selection of a further edge of the plurality of edges and the traversal of the selected further edge from the target node to the source node is performed iteratively for each item in the intermediate set of result items.

13. The system of claim 10, wherein the graph query indicates a target node comprising a plurality of target item types, and wherein the selection of a first edge of the plurality of edges and the traversal of the selected first edge from the source node to the target node is performed iteratively for each of the plurality of target item types, so that the intermediate set of result items comprises the items of the data source which belong to any of the plurality of target item types.

14. The system of claim 13, wherein the selection of a further edge of the plurality of edges and the traversal of the selected further edge from the target node to the source node is performed iteratively for each of the plurality of target item types.

15. The system of claim 10, wherein the processing resources are further configured to store item IDs in the intermediate set of results, the item IDs representing the respective items in the data source.

16. The system of claim 10, further comprising a non-transitory computer readable storage medium configured to store the intermediate set of result items returned as the result of the graph query.

17. The method of claim 1, wherein the source node and the target node are neighboring nodes connected by the plurality of edges.

18. The method of claim 1, wherein the source node and the target node are directly adjacent to each other and are connected by the plurality of edges.

19. The method of claim 1, wherein:
selecting the first edge of the plurality of edges in (a) comprises selecting the edge which, when traversed in (b), is expected to result in a minimal intermediate set of result items from the plurality of edges; and
selecting the further edge of the plurality of edges in (c) comprises selecting the edge which, when traversed in (d), is expected to result in a minimum intermediate set of results items from the plurality of edges which have not been selected.

\* \* \* \* \*